United States Patent
Hutchison et al.

(10) Patent No.: US 10,901,646 B2
(45) Date of Patent: Jan. 26, 2021

(54) UPDATE OF RAID ARRAY PARITY

(71) Applicant: International Business Machines Corporation, Armonk, NY (US)

(72) Inventors: Gordon D. Hutchison, Eastleigh (GB); Alastair Cooper, Winchester (GB); John P. Agombar, Winchester (GB); Ian Boden, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 16/206,023

(22) Filed: Nov. 30, 2018

(65) Prior Publication Data

US 2020/0174689 A1 Jun. 4, 2020

(51) Int. Cl.
*G06F 3/06* (2006.01)
*G06F 11/10* (2006.01)

(52) U.S. Cl.
CPC .......... *G06F 3/0646* (2013.01); *G06F 3/0604* (2013.01); *G06F 3/0611* (2013.01); *G06F 3/0689* (2013.01); *G06F 11/1056* (2013.01)

(58) Field of Classification Search
None
See application file for complete search history.

(56) References Cited

U.S. PATENT DOCUMENTS

| | | | |
|---|---|---|---|
| 6,101,615 A | 8/2000 | Lyons | |
| 7,389,393 B1 * | 6/2008 | Karr | G06F 3/0613 711/103 |
| 8,578,094 B2 | 11/2013 | Chambliss et al. | |
| 9,128,910 B1 * | 9/2015 | Dayal | G06F 11/22 |
| 9,720,596 B1 | 8/2017 | Bono et al. | |
| 2002/0032882 A1 * | 3/2002 | Mann | G06F 11/1076 714/6.11 |
| 2004/0015657 A1 * | 1/2004 | Humlicek | G06F 11/1076 711/114 |
| 2004/0078643 A1 * | 4/2004 | Ghosh | G06F 11/1076 714/6.2 |
| 2011/0302446 A1 * | 12/2011 | Becker-Szendy | G06F 11/1076 714/6.1 |
| 2012/0233406 A1 * | 9/2012 | Igashira | G06F 12/0866 711/118 |
| 2013/0117603 A1 | 5/2013 | Jess et al. | |
| 2014/0379990 A1 * | 12/2014 | Pan | G06F 12/0868 711/135 |
| 2015/0199151 A1 * | 7/2015 | Klemm | G06F 3/0659 711/114 |
| 2015/0339194 A1 | 11/2015 | Kalos et al. | |

(Continued)

OTHER PUBLICATIONS

Nou et al., "Performance Impacts with Reliable Parallel File Systems at Exascale Level," Chapter from book Online Automated Reliability Classification of Queueing Models for Streaming Processing Using Support Vector Machines, Aug. 2015, pp. 277-288, DOI: 10.1007/978-3-662-48096-0_22; https://www.researchgate.net/publication/283633743_Performance_Impacts_with_Reliable_Parallel_File_Systems_at_Exascale_Level.

*Primary Examiner* — Kaushikkumar M Patel
(74) *Attorney, Agent, or Firm* — Peter J. Edwards

(57) ABSTRACT

A RAID controller may update a RAID array by receiving updated data for a first data strip in a set of data strips in the RAID array. The RAID controller may then determine that the first data strip is stored on a device that is experiencing a slow condition. The RAID controller may then force, based on the determining, a promoted stripe write.

13 Claims, 5 Drawing Sheets

(56) References Cited

U.S. PATENT DOCUMENTS

| | | | |
|---|---|---|---|
| 2017/0097886 A1* | 4/2017 | Banerjee | G06F 12/0804 |
| 2018/0246793 A1* | 8/2018 | Jin | G06F 11/1076 |
| 2019/0236002 A1* | 8/2019 | Chawla | G06F 3/061 |
| 2019/0286523 A1* | 9/2019 | Cassano | G06F 11/1076 |

* cited by examiner

UPDATE OF RAID ARRAY PARITY

BACKGROUND

The present disclosure relates to updating RAID arrays, and more specifically, to updating RAID arrays in the presence of slow devices.

RAID arrays distribute data over multiple storage devices. When updating data in a RAID array, it is sometimes necessary to update the data on multiple devices. Some RAID arrays include parity storage for redundancy. It is also sometimes necessary to update the parity storage when updating a RAID array. When a device in the RAID array is experiencing a slow condition, updating parity storage is significantly less efficient than when no devices are experiencing a slow condition.

SUMMARY

Some embodiments of the present disclosure can be illustrated as a method of updating a RAID array with a set of data strips and a set of parity strips. The method may comprise receiving, by a RAID controller, updated data for a first data strip in the set of data strips. The method may also comprise determining, by the RAID controller, that the first data strip is stored on a device that is experiencing a slow condition. The method may also comprise forcing, by the RAID controller and based on the determining, a promoted stripe write.

Some embodiments of the present disclosure can also be illustrated as a computer program product. The computer program product may comprise a computer readable storage medium having program instructions embodied therewith. The program instructions may be executable by a computer to cause the computer to receive, by a RAID controller of a RAID array with a set of data strips and a set of parity strips, updated data for a first data strip in the set of data strips. The program instructions may also cause the computer to determine, by the RAID controller, that a second data strip is stored on a device that is experiencing a slow condition, wherein the second data strip is not affected by the updated data. The program instructions may also cause the computer to prohibit, by the RAID controller and based on the determining, a promoted stripe write.

Some embodiments of the present disclosure can also be illustrated as a system comprising a RAID array with a set of data strips and a parity strip. The set of data strips may be composed of a subset of X data strips and a subset of Y data strips. The system may also comprise a processor and a memory in communication with the processor. The memory may contain program instructions that, when executed by the processor, are configured to cause the processor to perform a method. The method may comprise receiving, by a RAID controller, an update request for the subset of X data strips. The subset of X data strips may be composed of a subset of A data strips and a first data strip. The update request may comprise a replacement first data strip and a replacement subset of A data strips. The method may also comprise determining, by the RAID controller, that the first data strip in the subset of X data strips is on a device that is experiencing a slow condition. The method may also comprise creating, by the RAID controller and based on the determining, an updated parity strip. The content of the updated parity strip may be based upon an XOR operation between the replacement first data strip, the replacement subset of A data strips, and the subset of Y data strips. The method may also comprise replacing, by the RAID controller and based on the determining, the subset of A data strips with the replacement subset of A data strips. The method may also comprise replacing, by the RAID controller, the parity strip with the updated parity strip. The method may also comprise recording, by the RAID controller, the first data strip as requiring an update once the slow condition has ended.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
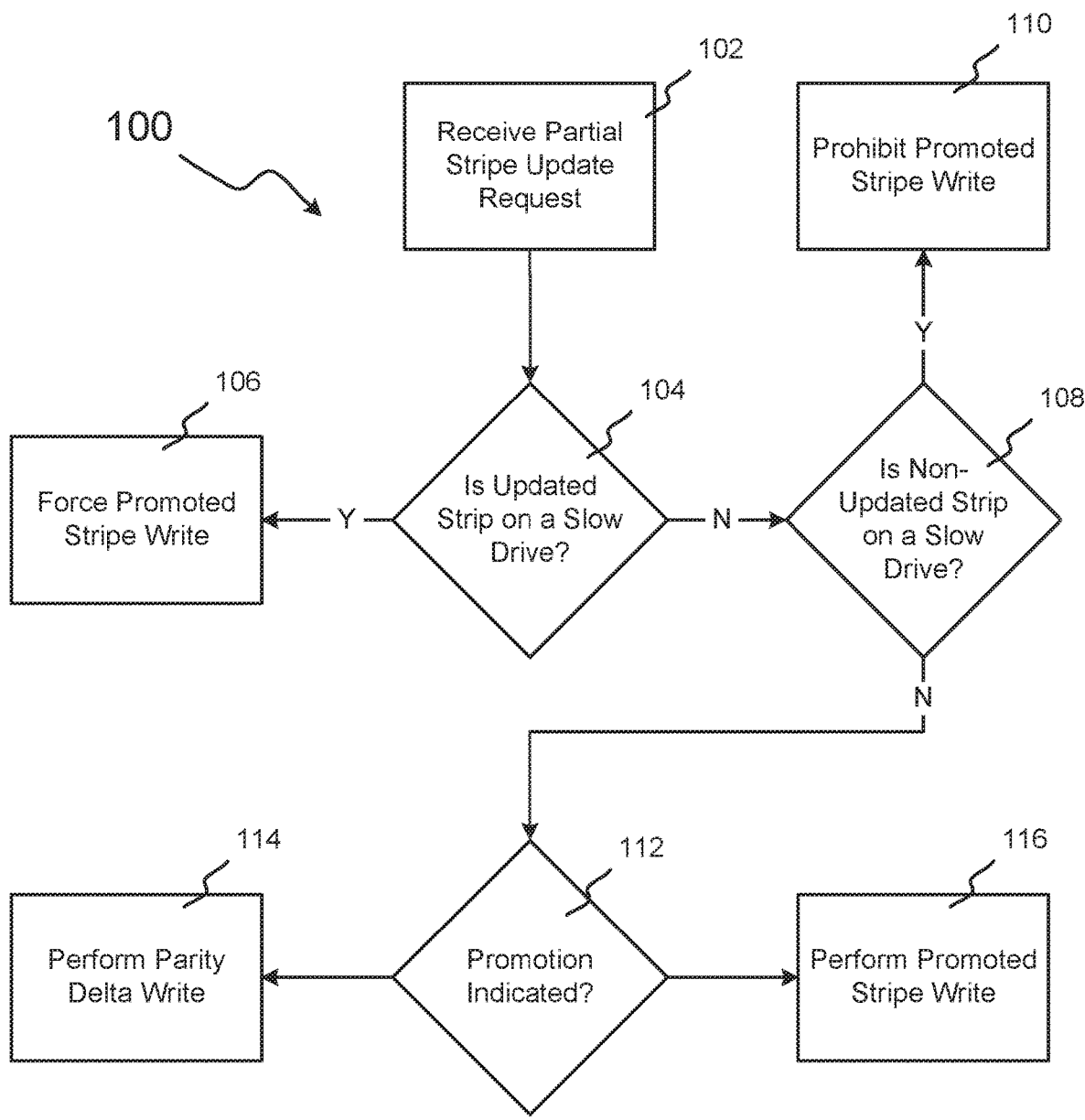
FIG. 1 depicts an example method of determining an optimal process by which to calculate an updated parity strip, in accordance with embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to RAID arrays, more particular aspects relate to optimizing updates to RAID arrays. While the present disclosure is not necessarily limited to such applications, various aspects of the disclosure may be appreciated through a discussion of various examples using this context.

Storage devices may be organized into arrays known as redundant arrays of independent disks (herein referred to as "RAID arrays"). When storage devices, such as hard disk drives (HDDs) and solid state drives (SSDs), are included in a RAID array, the speed of reading data from the drive or writing data to the drive may increase. Several different standards for RAID arrays exist. In typical standards for RAID arrays, storage devices are partitioned into data "strips," which typically take the form of same-size blocks of data on each storage device. For example, in a RAID array with four storage devices, each storage device may, hypothetically, be broken down into 20 kilobyte (kB) strips. Therefore, if each storage device were, 1 terabyte (tB), each storage device could be composed of fifty million 20-kB strips (1 tB/20 kB=50,000,000).

When writing to a RAID array, data typically is written to the storage devices in order of the strips. For example, if a 100 kB data set were written to the previously described four-storage-device RAID array, the kilobytes 1-20 may be written to the first strip on the first storage device, kilobytes 21-40 may be written to the first strip on the second storage device, kilobytes 41-60 may be written to the first strip on the third storage device, kilobytes 61-80 may be written to the first strip on the fourth storage device, and kilobytes 81-100 may be written to the second strip on the first storage device.

RAID array strips may, for convenience, be numbered. For example, the strips in the array may be assigned numbers in the order in which data is written on them. For example, the strip to which kilobytes 1-20 were written in the previous illustration (i.e., the first strip on the first storage device) may be numbered strip 1. The first strip on the second device may be numbered strip two, and the second strip on the first device may be numbered strip 5. A set of strips that spans the entire array is referred to as a stripe. For example, in a RAID array with four storage devices, strips 1-4 may compose a first stripe and strips 5-8 may compose a second stripe. Such a RAID array may be referred to as a four-strip array.

In some RAID array standards, data redundancy is created by establishing one or more parity strips. Parity strips are RAID array strips from which lost data may be recovered, and are typically stored on a different storage device than the data strips. Therefore, a RAID array with X data strips and M parity strips would typically require X+M storage devices. In some RAID arrays, a single storage device may hold all parity strips for the RAID array. In other RAID arrays, the parity strips may be distributed throughout the storage devices in the RAID array.

Methods of calculating the parity strip for a data stripe may vary, but in typical RAID arrays a parity strip for a set of data strips is calculated by performing an exclusive OR (herein referred to as XOR) operation on the data strips in the stripe. In basic terms, an XOR operation for a set of parity strip compares corresponding bits of each data strip and outputs a TRUE or FALSE (i.e., 1 or 0) bit based on whether the corresponding bits are unequal. For example, if the first bit of strip 1 is 0 and the first bit of strip 2 is 0, an XOR operation performed on the first two strips would return 0 as the first bit, because the first bit of strip 1 and the first bit of strip 2 are not unequal (therefore, the XOR operation returns 0 for FALSE). A set of data that holds the XOR results for an entire stripe of data may be referred to as a parity strip, and is the same size as the strip size (e.g., four 20-kB data strips would produce a 20 kB parity strip). Each bit in a parity strip for a stripe, in some RAID standards, may correspond to the XOR results of the corresponding bits for all data strips in the stripe.

For example, in typical parity calculations, chain XOR operations are performed on the strips of a stripe in order. If a four-strip RAID array had one parity strip, the first parity strip could be calculated by first performing an XOR operation data between strips 1 and 2, which would produce a first result (i.e., a 1 or a 0 for each pair of bits in the strips). An XOR operation could then be performed between this first result and strip 3, which would produce a second result. An XOR operation could then be performed between the second result and the strip 4, which would produce the parity strip.

Regardless of how a parity strip is calculated precisely, the parity strip is calculated such that any single data strip in the stripe can be restored by comparing the remaining data strips and the parity strip. For example, in a four data strip RAID array with one parity, if strip 3 were lost, a RAID controller could calculate what strip 3 was by analyzing strips 1, 2, 4, and the parity strip.

Typical RAID arrays are coupled to a RAID controller. A RAID controller may be a specialized piece of hardware (e.g., a processor that is designed particularly to manage RAID arrays) or a set of instructions that runs on a generalized piece of hardware (e.g., a RAID controller program that runs on a workstation processor).

The RAID controller typically manages the data in the RAID array. For example, a RAID controller may keep a record of the number and location of each strips, as well as whether each strip is a data strip or a parity strip. A RAID controller may also keep a record of the members of each stripe in the RAID array. In other words, the RAID controller may, for example, maintain a list of stripes that are stored on the RAID array, and, for each stripe, a list of the strips that are members of that stripe. As a hypothetical example, a RAID controller may, for a particular 10-device RAID array, maintain a list of 5 stripes on the array: stripes A, B, C, D, and E. The RAID controller may also record that stripe A contains strips 1-10, stripe B contains strips 11-20, stripe C contains strips 21-30, and so on. Finally, the RAID controller may also record that each stripe contains two parity strips, and that strips 3 and 9 are stripe A's parity strips, strips 11 and 20 are stripe B's parity strips, and so on.

RAID controllers typically also manage updates to the RAID array. For example, a host (e.g., the owner of the RAID array, the owner of the data on the RAID array, or a computer that is operated by the owner of the data of the RAID array) may send a request to the RAID array to update data on the RAID array. For example, this may take the form of a request to update a file or set of files on the RAID array. Because data is written to the RAID array in strips, the file or set of files to be updated may be spread across multiple strips in the RAID array (and thus, multiple devices). Therefore, the RAID controller typically determines the location of data to be updated (e.g., the stripe, strip(s), and storage device(s) on which the data is located).

A RAID controller, thus, typically has access to storage in order to maintain the data needed to manage a RAID array. In some RAID arrays, this storage may be found on the RAID array itself (e.g., on one disk of the RAID array, spread throughout all disks of the RAID array). In other embodiments, a RAID controller may have access to a separate storage device that maintains information about the RAID array. In some instances, a RAID controller may also have access to memory (e.g., volatile random access memory or secure random access memory) in which to store data updates that are to be written to the RAID array. For example, when a host requests an update to the data on the RAID array, the RAID controller may store that updated data in memory before writing the data to the RAID array. In some instances, the RAID controller may only store particular updates to a strip or strips. In those instances, the RAID controller may update the RAID array by making localized changes to the affected strips. In other instances, the memory may be large enough that the RAID controller may write a replacement strip in the memory for every strip in the RAID array that is updated. In those instances, the RAID controller may update the RAID array by replacing any affected strips with the updated strips from memory.

The RAID controller may also be responsible for determining the most efficient method to update the data on the RAID array. The "most efficient" method of updating data on a RAID array is typically measured by the number of input and output operations (i.e., reads and writes, also referred to herein as I/O operations) required to update the data and parity on the array. Thus, a primary responsibility of the RAID controller is to calculate the amount of I/O operations that would be required for various actions on the RAID array.

When updating the data in a RAID array, the RAID controller may also manage the updates to corresponding parity strips. Because the parity strip for a stripe depends upon the data in the stripe, there is a chance that a parity strip for a stripe may need to be updated any time the data of any strip for that stripe is updated. For example, if a stripe is composed of 6 data strips and 1 parity strip, the first parity strip (i.e., the parity strip for the first data stripe) may need to be updated if the data in data strip 3 were updated. Similarly, the second parity strip (i.e., the parity strip for the second data stripe) may need to be updated if the data in data strip 8 were updated. Several methods of calculating the necessary changes to a parity strip after an update to a data stripe may be used.

Ensuring that the calculation of parity updates (and the subsequent updates to parity strips) is as efficient as possible is a significant portion of ensuring that a RAID array runs efficiently. Typically, this involves determining which particular method of identifying the required updates to a parity strip would add the fewest amount of I/O operations to the RAID array update. The particular method that is most efficient typically depends on the percentage of data strips that were changed in the stripe update.

The simplest method of updating a parity strip occurs when every single data strip in a corresponding stripe is changed by the update. This is referred to as a full-stripe update (also referred to as a "full-stripe write"). In a full-stripe write, the host requesting the update typically provides new data for each strip in the stripe. Thus, in a full-stripe update, data for each data strip is typically already available to the RAID controller and the storage devices in the RAID array do not need to be accessed (i.e., read from) in order to obtain the data needed to calculate the parity for the stripe. Rather, a new chain XOR operation can be performed on all the updated data strips already in memory to calculate a new parity strip. Each updated data strip could then be written to the corresponding storage device, and the recently calculated parity strip could replace the previous parity strip for the stripe.

However, if only a subset of strips in a stripe are updated, the most efficient manner of calculating the updated parity strip may depend on the proportion of the data strips in the stripe that are updated. In typical RAID arrays, if a low proportion of the data strips in a strip are updated, the most efficient method of calculating the updated parity strip typically involves reading the old data for the updated strips and comparing that old data for each strip with the updated data. If, for example, strips 1-2 of an 8-strip stripe were updated, a RAID controller may calculate the updated parity by first accessing the data for strips 1-2 on the storage devices before the strips are rewritten. The RAID controller may then determine the bits that are different between the old strip 1 and the updated strip 1 and between the old strip 2 and the updated strip 2. If, as a theoretical example, the first bit in strip 1 changed from a 0 to a 1, but the first bit in strip 2 remained the same, the RAID controller would determine that the first bit in the parity strip would need to change. If, however, the first bit in strip 1 changed and the first bit in strip 2 changed, the RAID controller would determine that that the first bit in the parity strip would remain the same. This theoretical concept may be extended to more practical numbers. For example, a host may be unlikely to change only the first bit in a two-strip write, but may change the first ten kB in strip 2, which would then be compared to changes in strip 1 to determine whether parity changes are necessary.

By examining the changes to all the bits in the updated strips, the RAID controller is able to determine the bits that must be updated in the parity strip. This method is typically referred to as the "parity delta" method. In the above example of the parity delta method, the RAID controller would need to perform 3 reads (1 read of the storage device that stores strip 1, 1 read of the storage device that stores strip 2, and 1 read of the storage device that stores the parity strip), perform the comparison of the old and new data for strips 1 and 2, locate the bits to update in the parity strip, and perform 3 writes (1 write to the storage device that stores strip 1, 1 write to the storage device that stores strip 2, and 1 write to the device that stores the parity strip). Importantly, this method would total 6 total I/O operations.

If, on the other hand, a high proportion of the data strips in a stripe are updated, the most efficient method of updating the parity strip typically involves accessing the strips of the non-updated devices, and performing an XOR operation on the updated strips and non-updated strips. This is oftentimes referred to as a promoted stripe write. A promoted stripe write in effect simulates the actions that would occur if a host were requesting an update to all strips in a stripe. If, for example, strips 1-6 of an 8-strip stripe were updated, a RAID controller may read strips 7-8 and perform a chain XOR operation on strips 1-8 (i.e., on updated strips 1-6 and non-updated strips 7-8) as if the entire stripe were being updated. This would provide an updated parity strip in the same way that a full-stripe write would provide an updated parity strip.

By promoting the partial stripe write to function like a full stripe write, a RAID controller may increase overall efficiency in some situations. In the above example of the promoted stripe write, the RAID controller would need to perform 2 reads (1 read of the storage device that stores strip 7, and 1 read of the storage device that stores strip 8) and 7 writes (6 writes to update strips 1-6 and 1 write to update the parity strip). This would total 9 I/O operations to update the parity strip. However, if the RAID controller updated the parity strip by utilizing the parity delta method, the RAID controller would need to perform 7 reads (1 read for each storage device that stores strips 1-6 and 1 read for the storage device that stores the parity strip), perform the comparison between the old and new data for strips 1-6, locate the bits to update in the parity strip, and perform 7 writes (6 writes to update strips 1-6 and 1 write to update the parity strip). This would total 14 I/O operations. Thus, performing the parity delta method would, in this case, require 5 extra read operations, as well as potentially added calculation inefficiency.

The above discussed methods of updating parity perform well when all devices of a stripe are responding quickly. However, this is not always a realistic assumption in typical RAID arrays. In typical RAID arrays, storage devices may exhibit slow periods at several points in their life cycles, sometime by design. For example, performing media recovery on a spinning disk drive requires exclusive access to the media for many revolutions of the spinning disk, potentially causing long slowdowns. Further, storage devices require firmware updates at various times during their life cycles, which can have significant impact on device performance until the update is complete. If an update to a stripe is requested when a storage device is slow, overall efficiency of the update could be very greatly impacted. For example, the latency of a slow device may be thousands of times greater when the device is performing slowly, which multiplies the amount of time it takes to read the slow device by thousands of times as well.

Slow devices are such a frequent occurrence in RAID arrays that RAID controllers have methods to identify when a device is slow and avoid writing to that device until the device has sped back up. For example, if a RAID controller attempts to write to a device that has been identified as slow, the RAID controller may mark the strip on that device as needing to be updated, and monitor the device until it speeds up. When the device speeds up, the RAID controller may then update the strip on that device from the RAID controller's memory.

However, RAID controllers do not take proper account of device slowness when determining the most efficient method by which to calculate updates to parity. Because reading from a slow device to calculate parity changes can be so catastrophic to RAID array efficiency, typical storage controllers do have some rudimentary methods to avoid slow devices when performing parity calculations in partial stripe updates. However, typical RAID controllers only take device slowness into account after identifying the method by which to calculate parity updates. For example, a RAID controller may receive a request to perform a partial stripe update on a RAID array, and determine whether to perform the parity delta or promoted stripe write based solely on the amount of I/O operations between those methods. After making that determination, the RAID controller may then identify whether any devices are slow, and avoid reading or writing to that device when performing the determined parity calculation method. This process does not properly account for the device slowness, and often greatly increases the amount of read operations that are necessary in order to calculate the parity updates that are necessary in light of changes to a strip on the slow device.

If, for example, strips 1-2 of an 8-strip stripe were updated, a RAID controller may normally calculate the updated parity utilizing the parity delta method, as discussed above. However, if strip 2 occurs on a slow device, reading the storage device that stores the old strip 2 would take an extremely long amount of time. Therefore, some RAID controllers avoid this issue by using the remaining data strips and the parity strip to calculate the value of the old strip 2. This, unfortunately, requires reading the old strip 1 and strips 3-8 and the parity strip, for a total of 8 reads. The RAID controller then needs to perform a chain XOR operation on all the read strips to calculate the values of old strip 2. It is only at that time that the RAID controller is able to begin to perform the parity delta. Typical RAID controllers go through these steps and would then perform the parity delta at this point, but the number of reads that is added to the parity-delta calculation significantly impacts the overall efficiency of the update to the RAID array.

As a further example, if strips 1-6 of an 8-strip stripe were updated, a RAID controller may attempt to perform a promoted stripe write. This would typically require reading strips 7-8 and performing a chain XOR operation on strips 1-8 as if the entire stripe were being updated. However, if strip 8 occurs on a slow device, reading the storage device that stores strip 8 would take an extremely long amount of time. Therefore, as discussed above, some RAID controllers avoid this issue by using the remaining data strips and the parity strip to calculate the value of strip 8. However, as with the parity delta discussion, this extra calculation would require reading from the old strips 1-6, strip 7, and the parity strip, again adding a total of 8 reads. Similarly, the RAID controller would then need to perform a chain XOR operation on all the read strips to calculate the values of strip 8. It is only at that time that the RAID controller is able to perform the promoted stripe write. Typical RAID controllers go through these steps and would then perform the promoted stripe write at this point, but the number of reads that is added to the promoted-stripe-write calculation significantly impacts the overall efficiency of the update to the RAID array.

Embodiments of the present disclosure improve upon optimization of parity updates by taking into account the location of a slow device when determining the most efficient method of calculating updates to parity. Some embodiments of the present disclosure may, for example, force a promotion to a full stripe write even when the number of devices affected by an update would not normally justify such a promotion. Some embodiments of the present disclosure may also prohibit the promotion to a full stripe write even when the number of devices affected by an update would normally merit such a promotion. Embodiments of the present disclosure may, in doing so, save input/output operations (e.g., reads and writes to disks) and save time, allowing updates of RAID arrays to occur, on average, more quickly and efficiently. In this way, the embodiments of the present disclosure increase the efficiency of RAID arrays over conventional methods. Some embodiments of the present disclosure not only avoid reading from a slow device, but also writing to the slow device until the device performance has improved.

FIG. 1 illustrates an example method 100 by which a RAID controller may determine the optimal method of calculating an updated parity strip based on the presence or absence of a slow device. Method 100 may apply to RAID arrays with any number of data strips and parity strips that comport with the embodiments of the present disclosure. In block 102, the RAID controller receives a request from a host to perform a partial stripe update. In block 104, the RAID controller determines whether the request involves updating a data strip that is stored on a slow device. In some embodiments, this may involve determining a list of strips that are updated, determining a list of devices on which those strips are stored, and determining whether any of those devices are in a slow state.

If the RAID controller determines in block 104 that an updated strip occurs on a slow device, the RAID controller forces a promoted stripe write to determine parity in block 106. In a forced promoted stripe write, the RAID controller may read the data from the non-updated strips and perform a chain XOR operation between the updated strips and the non-updated strips to calculate the updated parity. However, the RAID controller may delay writing an updated strip onto a slow device until the device has recovered from its slow state. More information regarding the forcing a promoted stripe write is available in the discussion accompanying FIGS. 2 and 3.

If, on the other hand, the RAID controller determines in block 104 that no updated strip occurs on a slow device, the RAID controller determines in block 108 if a non-updated strip is stored on a slow device. In some embodiments, this may involve determining a list of strips that are not updated, determining a list of devices on which those strips are stored, and determining whether any of those devices are in a slow state.

If the RAID controller determines in block 108 that a non-updated strip is stored on a slow device, the RAID controller prohibits promotion to a stripe write in block 110. In some embodiments, prohibiting may take the form of interrupting a full stripe write that had been commenced before block 110. In some embodiments, prohibiting may take the form of the RAID controller preventing a full stripe write that had not commenced when block 110 occurred. In some embodiments, prohibiting may take the form of the RAID controller electing to not perform a full stripe write. Regardless of the form "prohibiting" takes, prohibiting the full stripe write may be useful for preventing the excessive reads that may be necessary in order to identify the contents of the strip on the slow device. This method may be particularly beneficial when a high percentage of the strips in the stripe are included in the update request in block 102, which is when a promoted stripe write would otherwise be likely.

If, on the other hand, the RAID controller determines in block 108 that there is no non-updated strip on a slow device, the RAID controller may determine how to perform the parity calculation based on the input/output operations of each method. This determination takes place in block 112, and may incorporate similar considerations as those that were previously discussed. If, for example, a small percentage of the strips in the stripe are included in the update request in block 102, the RAID controller may calculate that fewer I/O operations would be required to perform a parity delta method, and therefore may calculate the updated parity by the parity delta in block 114. If, however, a large percentage of the strips in the stripe are include in the update request in block 102, the RAID controller may calculate that fewer input/output operations would be require to promote to a full-stripe write, and therefore may calculate parity by the performing a chain XOR operation on all new and non-updated strips in block 116.

While FIG. 1 presents blocks 102-116 in a particular order, it is important to note that the exact order of the actions and decisions of method 100 may not be material. For example, in some embodiments a RAID controller may determine whether any updated strips and non-updated strips are stored on a slow device simultaneously (e.g., blocks 104 and 108 could take place simultaneously). In other embodiments, a RAID controller may determine whether promotion is indicated in block 112, and then perform blocks 104 and 108 and then override the determination of block 112 as necessary (e.g., where the RAID controller determines in block 112 to perform a parity delta, but then identifies in block 104 that an updated strip occurs on a slow device and forces a promoted stripe write in block 106).

Figure 2:
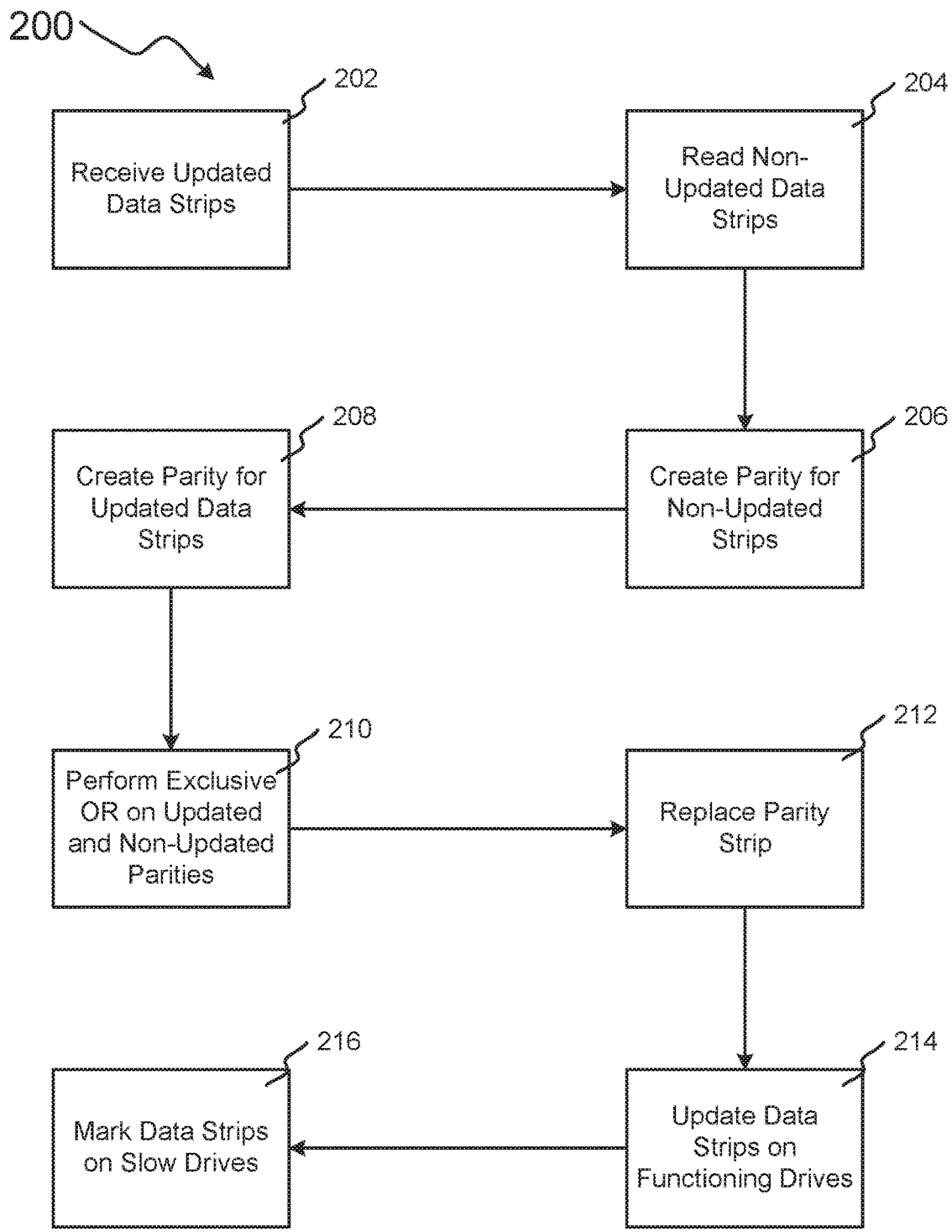
FIG. 2 depicts an example method of forcing a promoted stripe write, in accordance with embodiments.

FIG. 2 illustrates a method 200 of forcing a promoted stripe write upon detecting that a strip that is to be updated is stored on a slow device. For example, a RAID controller may be performing method 200 to force a promoted stripe write on an 8-data-strip RAID array with 1 parity strip. In such an example, three of the strips (e.g., strips 1-3) may be updated and one of the updated strips (e.g., strip 2) may be stored on a slow device. In block 202, the RAID controller receives the updated data strips of the RAID array (e.g., strips 1-3). In some embodiments, for example, the updated data strips may be received by a host that is requesting an update to the RAID array. In some embodiments, the RAID controller may have received the update request before receiving the updated strips, and thus in some embodiments the RAID controller may be aware that one of the updated strips corresponds to a strip on a slow device even before the updated strips are available.

In block 204, the RAID controller reads the non-updated strips. For example, in the previously discussed 8 data-strip RAID array, if strips 1-3 are being updated, the RAID controller would read strips 4-8 in block 204. Because the RAID controller receives updated strips 1-3 in block 202 and reads strips 4-8 in block 204, the RAID controller, at this point, has loaded all 8 data strips, and can therefore calculate parity without referencing any of the old strips (i.e., strips 1-3 before the update).

To begin to calculate parity, the RAID controller creates the parity for the non-updated strips in block 206. For example, the RAID controller could perform a chain XOR process on strips 4-8, resulting in a non-written parity subset. Similarly, the RAID controller creates parity for the updated data strips in block 208. For example, the RAID controller could perform a chain XOR operation on the newly provided strips 1-3, resulting in a written parity subset.

Once the written parity subset and non-written parity subset are created, the RAID controller performs an XOR operation between the two parity subsets in block 210 in order to calculate an updated parity strip. With the calculated parity strip, the RAID controller replaces the parity strip in block 212. The RAID controller also replaces, in block 214, the updated data strips that are stored on functioning (i.e., not slow) devices (e.g., strips 1 and 3). Finally, the RAID controller marks the updated data strip that is stored on the slow device (e.g., strip 2) in block 216. For example, this mark may indicate that strip 2 has updated data, but that updated data has not yet been written to the strip on the device because the device was experiencing a slow condition. This mark may remain on the strip until the device has recovered from its slow condition, at which point strip 2 may be written to the device.

As part of the forced promoted full-stripe write in method 200, a RAID controller may save several reads over typical RAID array update procedures. For example, method 200 was described with respect to an example 8-strip RAID array with 1 parity strip. Because 3 strips were being updated, 5 strips (strips 4-8) were read and 3 strips were written to (strips 1, 3, and the parity strip), for a total of 8 I/O operations. In typical RAID array update procedures, however, a RAID controller would likely perform a parity delta operation. In this instance, strips 1 and 3 would be read. If the RAID controller did not realize that that strip 2 is on a slow device, it may have attempted to read strip 2 as well, which may have taken as long as several thousand normal reads. If, on the other hand, the RAID controller did avoid reading from strip 2, typical RAID array update procedures would calculate strip 2 using the data from strips 1, 3-8, and the parity strip. This would require reading from strips 4-8 and the parity strip. Assuming that the RAID controller did not write to the slow disk, 3 writes would then be performed (strips 1, 3, and the parity device). Therefore, typical RAID operations would likely perform 7 reads and 3 writes, for a total of 10 I/O operations. Thus, by forcing a promoted full-strip write, the RAID controller would save 2 I/O operations, making the forced promoted full-stripe write more efficient and faster. Further, as the number of devices in the array increases, the benefit of performing the forced promoted full-strip write would also increase.

While method 200 is presented with blocks 202-216 in a particular order, in some embodiments the order of the operations in method 200 may be altered. For example, block 216 may occur at any point in the process. Further, blocks 206-210 may actually occur in one step, in which a chain XOR operation is performed on all updated strips and non-updated strips at once to calculate the updated parity strip.

Figure 3:
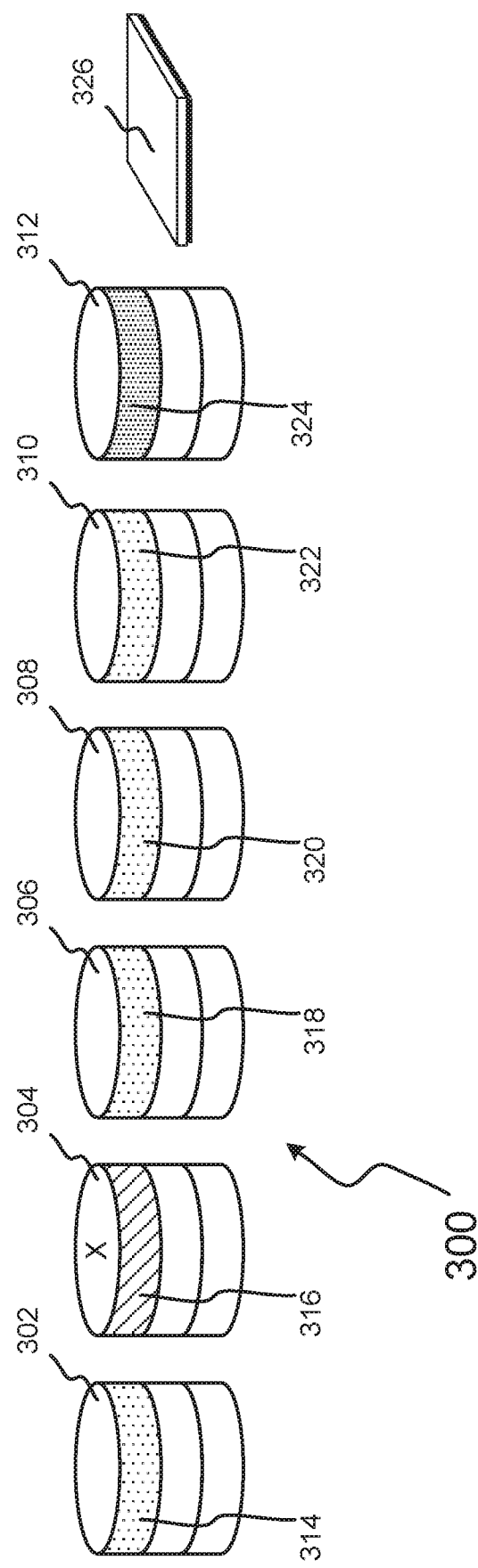
FIG. 3 depicts an example RAID array in which forcing a promoted stripe write may be beneficial, in accordance with embodiments.

FIG. 3 illustrates an example RAID array 300 in which it may be beneficial to force a promoted stripe write may be performed. RAID array 300 is composed of five data strips and 1 parity strip, stored on devices 302-312. Device 304 contains strip 316, for which RAID controller 326 has received an update request. However, device 304 is illustrated here with an X to signify that it is experiencing a slow condition. Devices 302 and 306-310 contain strips 314 and 318-322, which are not changed by the request from the host. Device 312 contains parity strip 324. Because strip 316 is being updated, parity strip 324 would be updated as well. RAID controller 326 may manage the updating of RAID array 300.

In typical RAID update procedures, RAID controller 326 would attempt to perform a parity delta calculation on RAID array 300. However, because device 304 is experiencing a slow condition, RAID controller 326 would likely read strips 314 and 318-324 in order to calculate the contents of strip 316. RAID controller could then compare strip 316 with the updated strip 316, calculate the necessary changes to parity strip 324, and update strip 324. Strip 316 could then be marked as requiring an update when device 304 recovered from the slow condition.

Thus, in total, typical parity delta update procedures would require 5 reads and 1 write for a total of 6 I/O operations. However, if RAID controller 326 forced a promoted stripe write, it would only need to read data from strips 314 and 318-320. RAID controller 326 could then calculate a new parity strip by performing a chain XOR operation on the updated strip 316 and strips 314-324. This new parity strip could then overwrite parity strip 324. This would require 4 reads and 1 write, which would total 5 I/O operations. Thus, forcing a promoted stripe write would be faster and more efficient even when only 5 data strips are involved.

Figure 4:
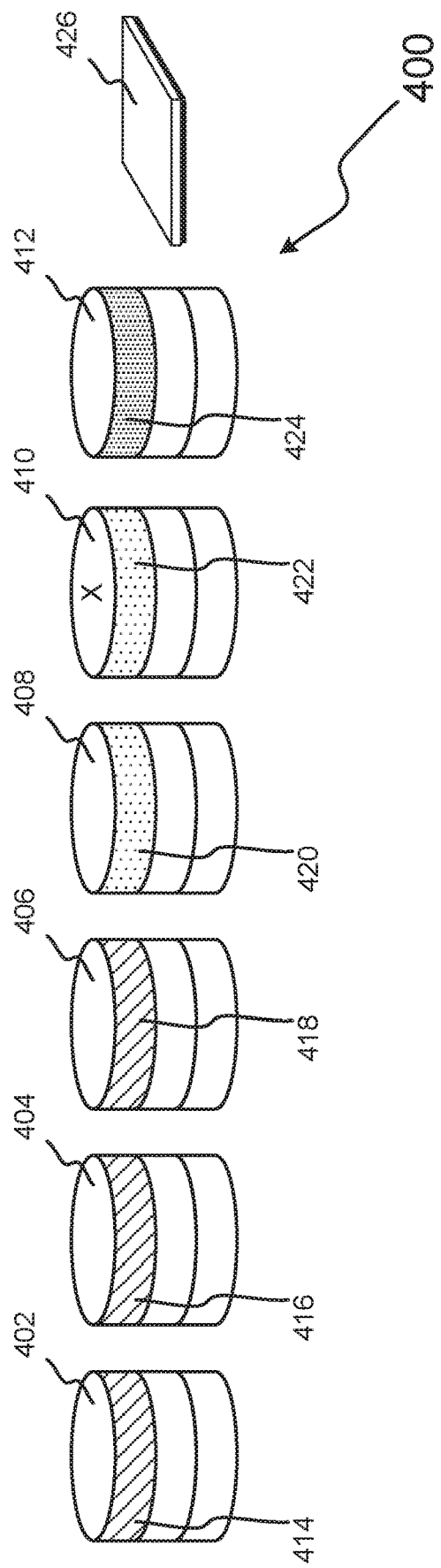
FIG. 4 depicts an example RAID array in which prohibiting a promoted stripe write may be beneficial, in accordance with embodiments.

FIG. 4 illustrates an example RAID array 400 in which it may be beneficial to prohibit a promoted stripe write. RAID array 400 is composed of 5 data strips and 1 parity strip on devices 402-412. Devices 402-406 contain strips 414-418, for which RAID controller 426 has received an update request. Devices 408 and 410 contain data strips 420 and 422, which are not affected by the update request. However, device 410 is illustrated here with an X to signify that it is experiencing a slow condition. Device 412 contains parity strip 424.

In typical RAID update procedures, a promoted stripe write would normally only require 2 reads (strips 420 and 422) and 4 writes (strips 414-418 and parity strip 424) for a total of 6 I/O operations. However, because strip 422 is on a slow device, reading strip 422 may take thousands of times longer than a typical strip. The RAID controller could, rather than reading strip 422, reconstruct strip 422 from strips 414 and 420 and parity strip 424. However, this would require 5 reads (strips 414-420 and parity strip 424). This, plus the 4 writes to update the RAID array (to strips 414-418 and parity strip 424) would total 9 I/O operations.

For that reason, upon determining that device 410 is slow and contains a strip that is not being updated, RAID controller 426 may prohibit a promotion to a stripe write. Rather, RAID controller 426 could perform a parity delta on data strips 414-418 and parity strip 424. This would require reading from strips 414-418 and parity strip 424 (i.e., 4 reads) to perform the parity comparison and writing to the same strips afterwards (i.e., 4 writes). This would be, in total, 8 I/O operations. However, because prohibiting the promotion to a stripe write would include reading from slow disk 410, the 8 I/O operations involved with performing parity delta calculation would be significantly faster than the 6 I/O operations involved with promoting.

Figure 5:
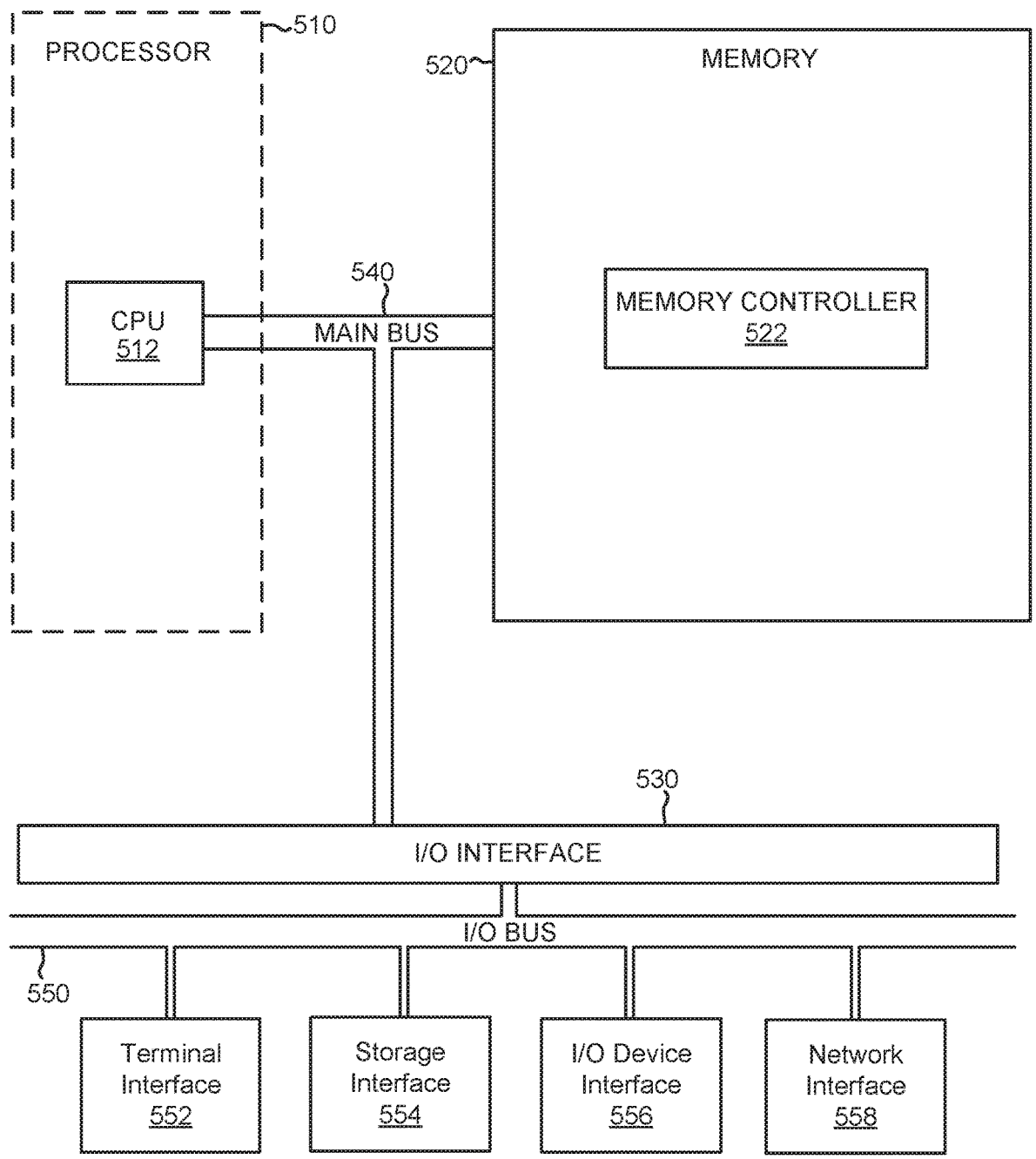
FIG. 5 depicts the representative major components of a computer system that may be used in accordance with embodiments.

FIG. 5 depicts the representative major components of an exemplary Computer System 501 that may be used in accordance with embodiments of the present disclosure. The particular components depicted are presented for the purpose of example only and are not necessarily the only such variations. The Computer System 501 may comprise a Processor 510, Memory 520, an Input/Output Interface (also referred to herein as I/O or I/O Interface) 530, and a Main Bus 540. The Main Bus 540 may provide communication pathways for the other components of the Computer System 501. In some embodiments, the Main Bus 540 may connect to other components such as a specialized digital signal processor (not depicted).

The Processor 510 of the Computer System 501 may be comprised of one or more CPUs 512. The Processor 510 may additionally be comprised of one or more memory buffers or caches (not depicted) that provide temporary storage of instructions and data for the CPU 512. The CPU 512 may perform instructions on input provided from the caches or from the Memory 520 and output the result to caches or the Memory 520. The CPU 512 may be comprised of one or more circuits configured to perform one or methods consistent with embodiments of the present disclosure. In some embodiments, the Computer System 501 may contain multiple Processors 510 typical of a relatively large system. In other embodiments, however, the Computer System 501 may be a single processor with a singular CPU 512.

The Memory 520 of the Computer System 501 may be comprised of a Memory Controller 522 and one or more memory modules for temporarily or permanently storing data (not depicted). In some embodiments, the Memory 520 may comprise a random-access semiconductor memory, storage device, or storage medium (either volatile or non-volatile) for storing data and programs. The Memory Controller 522 may communicate with the Processor 510, facilitating storage and retrieval of information in the memory modules. The Memory Controller 522 may communicate with the I/O Interface 530, facilitating storage and retrieval of input or output in the memory modules. In some embodiments, the memory modules may be dual in-line memory modules.

The I/O Interface 530 may comprise an I/O Bus 550, a Terminal Interface 552, a Storage Interface 554, an I/O Device Interface 556, and a Network Interface 558. The I/O Interface 530 may connect the Main Bus 540 to the I/O Bus 550. The I/O Interface 530 may direct instructions and data from the Processor 510 and Memory 520 to the various interfaces of the I/O Bus 550. The I/O Interface 530 may also direct instructions and data from the various interfaces of the I/O Bus 550 to the Processor 510 and Memory 520. The various interfaces may comprise the Terminal Interface 552, the Storage Interface 554, the I/O Device Interface 556, and the Network Interface 558. In some embodiments, the various interfaces may comprise a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—may communicate failures and changes to one or more components to a hypervisor or operating system (not depicted). The hypervisor or the operating system may allocate the various resources available in the Computer System 501 and track the location of data in Memory 520 and of processes assigned to various CPUs 512. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of updating a RAID array with a set of data strips and a set of parity strips, the method comprising:
 receiving, by a RAID controller, updated data for a first data strip in the set of data strips;
 determining, by the RAID controller, that the first data strip is stored on a device that is experiencing a slow condition; and
 forcing, by the RAID controller and based on the determining, a promoted stripe write, wherein a parity delta method of updating the set of parity strips would require fewer input and output operations than the promoted stripe.

2. The method of claim 1, wherein the promoted stripe write comprises calculating a new parity strip in the set of parity strips by performing a chain XOR operation on the set of data strips.

3. The method of claim 1, further comprising determining that the parity delta method of updating the set of parity strips would require fewer input and output operations.

4. The method of claim 1, wherein the device is a hard-disk drive.

5. The method of claim 1, wherein the device is a solid-state drive.

6. A computer program product, the computer program product comprising a computer readable storage medium having program instructions embodied therewith, the program instructions executable by a computer to cause the computer to:
 receive, by a RAID controller of a RAID array with a set of data strips and a set of parity strips, updated data for a first data strip in the set of data strips;
 determine, by the RAID controller, that a second data strip is stored on a device that is experiencing a slow condition, wherein the second data strip is not affected by the updated data; and
 prohibit, by the RAID controller and based on the determining, a promoted stripe write.

7. The computer program product of claim 6, wherein prohibiting comprises electing to not perform a promoted stripe write.

8. The computer program product of claim 6 wherein the a promoted stripe write would require fewer input and output operations than a parity delta method.

9. The computer program product of claim 8, wherein the computer instructions also cause the computer to determine that the promoted stripe write would require fewer input and output operations.

10. The computer program product of claim 6, wherein the device is a hard disk drive.

11. The computer program product of claim 6, wherein the device is a solid state drive.

12. A system comprising:
 a RAID array with a set of data strips and a parity strip, wherein the set of data strips is composed of a subset of X data strips and a subset of Y data strips;
 a processor;
 a memory in communication with the processor, the memory containing program instructions that, when executed by the processor, are configured to cause the processor to perform a first method, the first method comprising:
  receiving, by a RAID controller, an update request for the subset of X data strips, wherein the subset of X data strips is composed of a subset of A data strips and a first data strip and wherein the update request comprises a replacement first data strip and a replacement subset of A data strips;
  determining, by the RAID controller, that the first data strip in the subset of X data strips is on a device that is experiencing a slow condition;
  creating, by the RAID controller and based on the determining, an updated parity strip, wherein the content of the updated parity strip is based upon an XOR operation between the replacement first data strip, the replacement subset of A data strips, and the subset of Y data strips;
  replacing, by the RAID controller and based on the determining, the subset of A data strips with the replacement subset of A data strips;
  replacing, by the RAID controller, the parity strip with the updated parity strip; and
  recording, by the RAID controller, the first data strip as requiring an update once the slow condition has ended.

13. The system of claim 12, wherein the program instructions are further configured to cause the processor to perform a second method, the second method comprising:
 receiving, by the RAID controller, a second update request, wherein the second update request comprises a replacement subset of Y data strips;
 detecting, by the RAID controller, that the first data strip is experiencing a second slow condition;
 calculating, by the RAID controller and based on the detecting a second replacement parity strip, wherein the calculating comprises:
  comparing the replacement subset of Y data strips with the subset of Y data strips;
  identifying, based on the comparing, an update delta;
  determining, based on the update delta, an update to the parity strip;
 replacing, by the RAID controller, the subset of Y data strips with the replacement subset of Y data strips; and
 replacing, by the RAID controller, the parity strip with the second replacement parity strip.

* * * * *